United States Patent [19]

Ichikawa

[11] Patent Number: 4,721,446
[45] Date of Patent: Jan. 26, 1988

[54] TIRE VULCANIZER

[75] Inventor: Seizo Ichikawa, Kodaira, Japan

[73] Assignee: Bridgestone Corporation, Tokyo, Japan

[21] Appl. No.: 30,423

[22] Filed: Mar. 26, 1987

[30] Foreign Application Priority Data

Apr. 7, 1986 [JP] Japan .................. 51-52311[U]

[51] Int. Cl.$^4$ .................................................. B29C 35/04
[52] U.S. Cl. .................................................. 425/44; 264/501
[58] Field of Search ............... 425/23, 33, 51, 52, 425/53, 44, 24; 264/501

[56] References Cited

U.S. PATENT DOCUMENTS

| | | | |
|---|---|---|---|
| 2,699,572 | 1/1955 | Soderquist | 425/33 |
| 2,715,245 | 8/1955 | Soderquist | 425/33 |
| 2,743,480 | 5/1956 | Frank | 425/33 |
| 2,775,789 | 1/1957 | Soderquist | 425/33 |
| 3,029,469 | 4/1962 | Moore et al. | 425/33 |
| 3,632,712 | 1/1972 | Miller | 425/44 |
| 3,837,770 | 9/1974 | Gazuit | 425/33 |
| 3,887,313 | 6/1975 | Jaedicke et al. | 425/33 |
| 3,976,409 | 8/1976 | Athey | 425/33 |
| 4,035,117 | 7/1977 | Nakagawa et al. | 425/33 |
| 4,190,406 | 2/1980 | Geck et al. | 425/33 |
| 4,395,209 | 7/1983 | Singh et al. | 425/33 |
| 4,527,946 | 7/1985 | Singh et al. | 425/33 |

FOREIGN PATENT DOCUMENTS

| | | |
|---|---|---|
| 48-44192 | 12/1973 | Japan . |
| 56-28843 | 3/1981 | Japan . |
| 56-28844 | 3/1981 | Japan . |
| 57-185134 | 11/1982 | Japan . |

*Primary Examiner*—Willard Hoag
*Attorney, Agent, or Firm*—Cushman, Darby & Cushman

[57] ABSTRACT

A tire vulcanizer comprising a metal mold assembly, a bladder disposed within the metal mold assembly, a gas supply assembly arranged at a central portion of the metal mold assembly and adapted to supply pressure and heating gas to the bladder, and diffusion means provided in the gas supply assembly. The diffusion means is adapted to diffuse the pressure and heating gas in one direction or in two directions.

6 Claims, 12 Drawing Figures

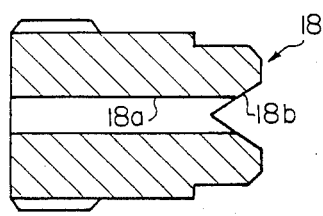
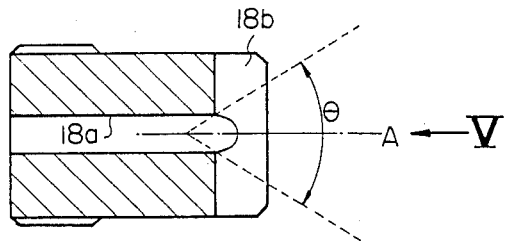
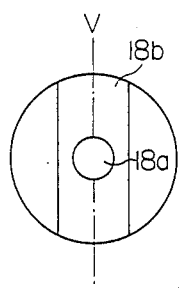
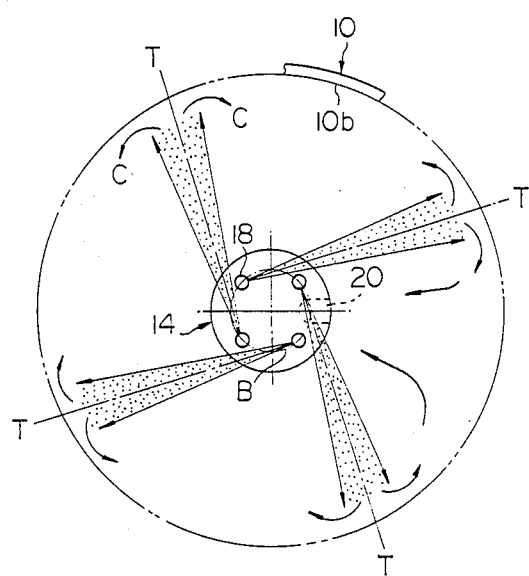

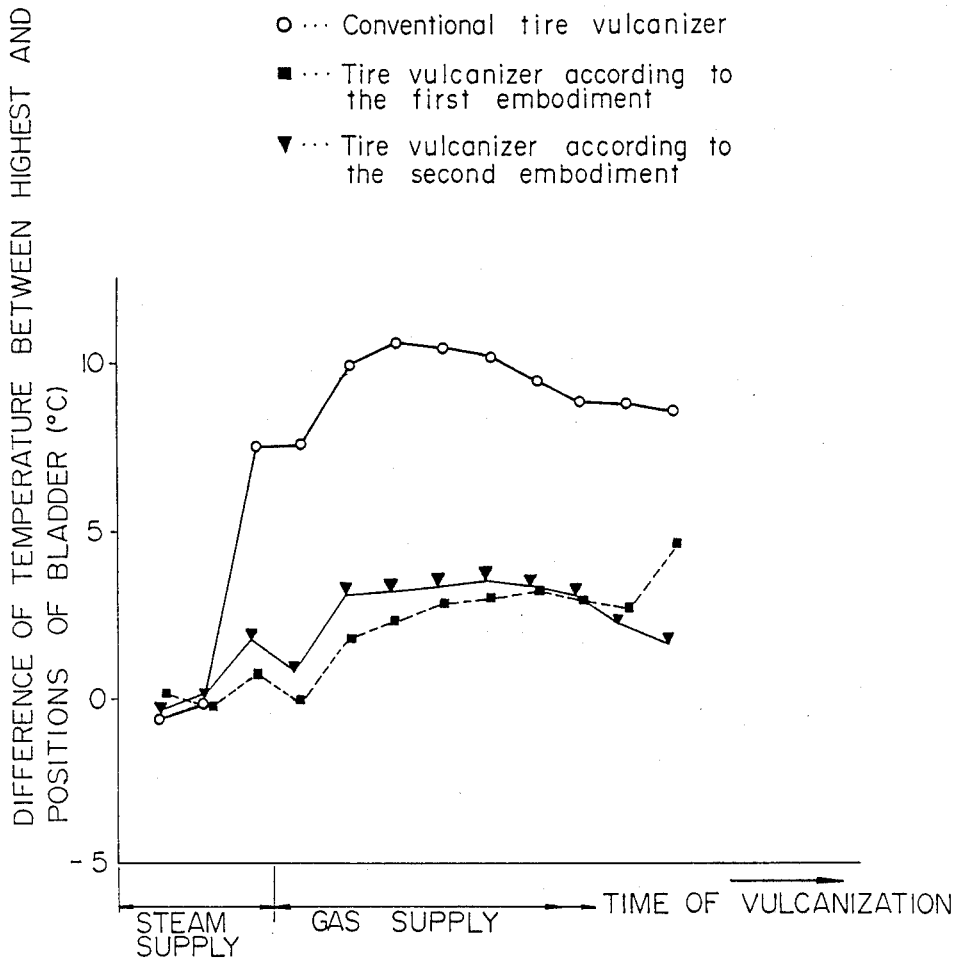

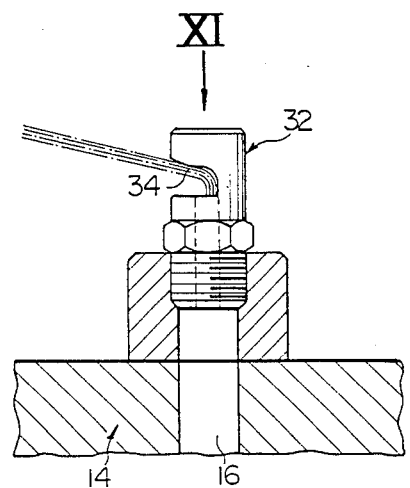
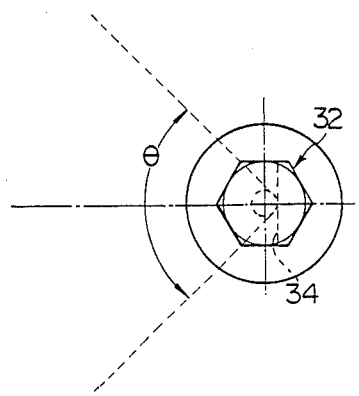
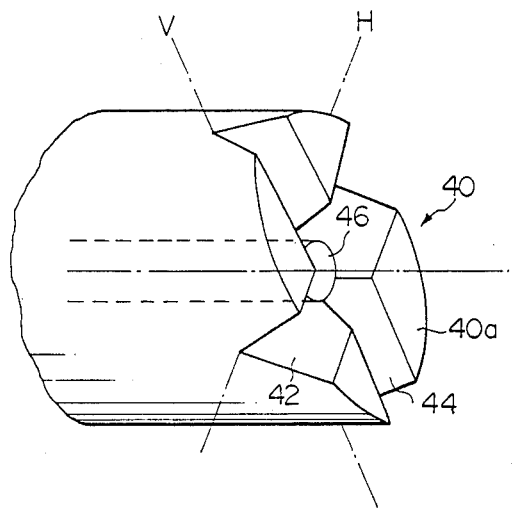

TIRE VULCANIZER

FIELD OF THE INVENTION

The present invention relates in general to a tire vulcanizer and in particular to a tire vulcanizer wherein gases of different kinds different in density are used as pressure and heating medium.

SUMMARY OF THE INVENTION

In accordance with an important aspect of the present invention, there is provided a tire vulcanizer comprising a metal mold assembly, a bladder disposed within the metal mold assembly, a gas supply assembly arranged at a central portion of the metal mold assembly and adapted to supply pressure and heating gas to the bladder, and diffusion means provided in the gas supply assembly and adapted to diffuse the pressure and heating gas in one direction. The diffusion means may comprise a plurality of diffusion nozzles each formed with a V-shaped notch extending in an upward and downward direction with respect to an axially extending axis of the diffusion nozzle so that the pressure and heating gas is diffused at an angle of between 30 and 45 degrees in the upward and downward direction. In addition, the diffusion means may comprise a plurality of diffusion nozzles each formed with a side notch so that the pressure and heating gas is diffused at an angle of between 80 and 120 degrees in a horizontal direction. In addition, the diffusion nozzles may be arranged equiangularly on a circle, which is in concentric relation with the metal mold assembly, so that the pressure and heating gas is emitted in a direction tangential to the circle.

In accordance with an important aspect of the present invention, there is provided a tire vulcanizer comprising a metal mold assembly, a bladder disposed within the metal mold assembly, a gas supply assembly arranged at a central portion of the metal mold assembly and adapted to supply pressure and heating gas to the bladder, and diffusion means provided in the gas supply assembly and adapted to diffuse the pressure and heating gas in two directions. The diffusion means may comprise a plurality of diffusion nozzles each formed with a first V-shaped notch extending in a horizontal direction so that the pressure and heating gas is diffused at an angle of between 30 and 45 degrees in the horizontal direction and with a second V-shaped notch extending in a vertical direction so that the pressure and heating gas is diffused at an angle of between 30 and 45 degrees in the vertical direction.

DESCRIPTION OF THE PRIOR ART

Representative conventional tire vulcanizers are shown, for example, in Japanese patent publication No. 48-44192, Japanese patent laid-open publication No. 56-28843 and Japanese patent laid-open publication No. 56-28844. These tire vulcanizers use hot water as pressure and heating medium within a bladder of the tire vulcanizer. In these cases, it has been found that the hot water can alleviate the difference of temperature in the circumferential direction of the interior of the bladder.

In recent years, in order to save energy, gas and steam have been used as pressure and heating medium within the bladder to vulcanize tires. In the case the gas and steam are used in the conventional tire vulcanizers disclosed in the aforementioned Japanese patent publication No. 48-44192, Japanese patent laid-open publication No. 56-28843 and Japanese patent laid-open publication No. 56-28844, it is necessary to alleviate the difference of temperature in the circumferential direction of the interior of the bladder. However, the blowoff port of these tire vulcanizers is merely communicated with the bladder and the configuration is not shaped so that the gas and steam are effectively diffused and mixed within the bladder. Therefore, if gas of high density having pressure effect and steam of low density having heating effect are used, they are not diffused and mixed satisfactorily. As a consequence, these conventional tire vulcanizers have disadvantages in that a larger difference of temperature occurs at the upper and lower portions of the bladder.

In order to prevent this difference of temperature between the upper and lower portions, a tire vulcanizer has been proposed in Japanese patent laid-open publication No. 57-185134. In this tire vulcanizer, the object is to improve the agitation and mixture of gases of two kinds different in density. However, a temperature difference of 10° C. has already occurred at the upper and lower portions of the bladder due to steam alone prior to the use of gas of high density. For this reason, there is the problem that a tire has not already vulcanized evenly at the first half of the vulcanization process. The reason is such that the blowoff port is merely communicated with the bladder and the cross-sectional configuration is merely of a circular shape or square shape. Therefore, the agitation and mixture effect by an injection force at the time of blowing cannot be expected. In addition, as shown in this publication, if an obstructive plate or the like is provided adjacent the blowoff port to direct upward the angle of blowoff, it is required to remove the obstructive plate when the bladder is changed, thereby requiring additional processes.

It is accordingly an important object of the present invention to provide an improved tire vulcanizer which prevents the drawbacks inevitably inherent in the prior art.

BRIEF DESCRIPTION OF THE DRAWINGS

The features and advantages of a tire vulcanizer according to the present invention will be more clearly understood from the following description in which like reference numerals designate corresponding or similar members throughout the figures of the drawings and in which:

FIG. 3 is an enlarged cross-sectional view of the diffusion nozzle substantially taken along line III—III indicated in FIG. 2, FIG. 4 is an enlargement of the diffusion nozzle shown in FIG. 2, FIG. 5 is an end view of the diffusion nozzle substantially taken along line V indicated in FIG. 4, FIG. 6 is a cross-sectional view showing a bladder and the diffusion nozzles substantially taken along line VI—VI indicated in FIG. 1, FIG. 7 shows the relation of the difference of temperature between highest and lowest positions within the bladder and the time of vulcanization, FIG. 10 is an enlarged view of the diffusion nozzle shown in FIG. 8 the diffusion nozzle being formed at the side portion thereof with a side notch so that pressure and heating gas is diffused at an angle of 80 and 120 degress in a horizontal direction, FIG. 11 is a top view of the diffusion nozzle substantially taken along line XI indicated in FIG. 10, the angle of diffusion in the horizontal direction being indicated by $\theta$, and FIG. 12 is a perspective view showing a diffusion nozzle according to another embodiment of the present invention, the diffusion nozzle being formed with a first V-shaped notch extending in a horizontal direction so that pressure and heating gas is diffused at an angle of between 30 and 45 degrees in the horizontal direction and with a second V-shaped notch extending in a vertical direction so that pressure and heating gas is diffused at an angle of between 30 and 45 degrees in the vertical direction.

DETAILED DESCRIPTION OF THE PREFERRED EMBODIMENTS

Figure 1:
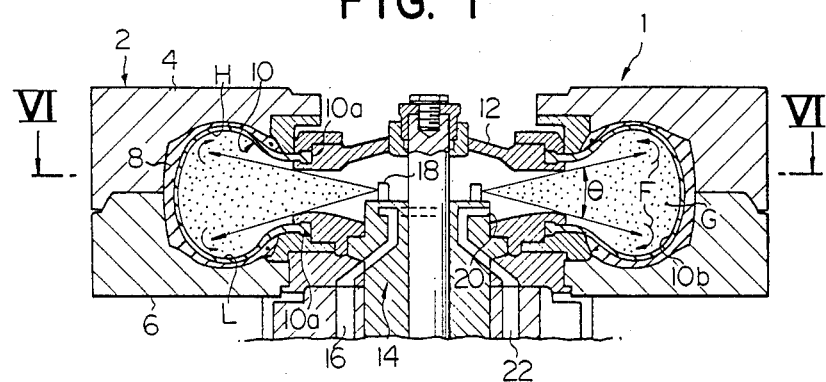
FIG. 1 is a cross-sectional view showing the tire vulcanizer constructed in accordance with an embodiment of the present invention.

Referring to FIGS. 1 to 6 of the drawings, there is shown a tire vulcanizer 1 constructed in accordance with a first preferred embodiment of the present invention. The tire vulcanizer 1 according to the present invention comprises a metal mold assembly 2 including an upper metal mold 4 and a lower metal mold 6 forming therebetween a metal mold chamber of substantially annular configuration in which a tire 8 to be vulcanized or cured is received, a bladder 10 disposed inside the tire 8 within the metal mold assembly 2, a bladder ring 12 adapted to retain in position inner circumferential ends 10a and 10a of the bladder 10 and secured at the central portion of the metal mold assembly 2, and a gas supply assembly 14 adapted to supply to the bladder 10 pressure and heating gas G such as steam and the like. Within the gas supply assembly 14 is formed a gas supply passageway 16 that is connected through a changeover valve (not shown) to a gas supply source (not shown) by which the pressure and heating gas G is suppled to the gas supply passageway 16. The gas supply passageway 16 is provided with diffusion means 18 to diffuse and emit the pressure and heating gas G within the bladder 10. The diffusion means 18 comprises a diffusion nozzle formed with an opening 18a axially extending therethrough. The axial opening 18a of the diffusion nozzle 18 is open at one end thereof to the gas supply passageway 16 and at the other end thereof to the bladder 10. The axial opening 18a has an axial direction A passing therethrough, as indicated in FIG. 4. Thus, the pressure and heating gas G is emitted from the diffusion nozzle 18 in the axial direction A. The diffusion nozzle 18 is further formed at the forward end of the axial opening 18a with a V-shaped notch 18b extending vertically or in the upward and downward direction V indicated in FIG. 5 with respect to the axial direction A of the axial opening 18a so that the pressure and heating gas G is diffused in the upward and downward direction V. The V-shaped notch 18b has an angle $\theta$ of diffusion that is between 30 and 45 degrees in the upward and downward direction V. Thus, the pressure and heating gas G is diffused at an angle of between 30 and 45 degrees in the upward and downward direction V. A plurality of such diffusion nozzles 18, as shown in FIG. 6, are arranged equiangularly on a circle B which is in concentric relation with the metal mold assembly 2. In this embodiment, the diffusion nozzles 18 comprise four diffusion nozzles. Each of the diffusion nozzles 18 is arranged such that the axial direction A of the diffusion nozzle 18 is substantially coincident with a tangential direction T of the circle B indicated in FIG. 6. Thus, the pressure and heating gas G is emitted in the tangential direction T of the circle B and diffused at an angle of between 30 and 45 degrees in the upward and downward direction V by the diffusion nozzles 18. A discharge port 20 is provided in the vicinity of one of the diffusion nozzles 18 so that the pressure and heating gas G is discharged from the discharge port 20 outside the tire vulcanizer 1 through a discharge passageway 22 formed in the gas supply assembly 14.

The operation of the tire vulcanizer 1 constructed in accordance with the first embodiment of the present invention will hereinafter be described.

Figure 2:
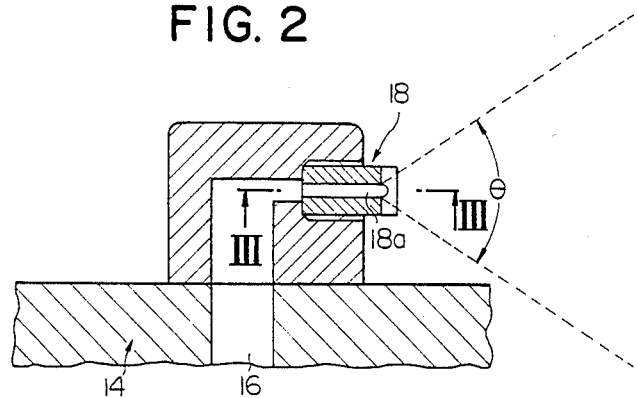
FIG. 2 is an enlarged cross-sectional view showing a diffusion nozzle of FIG. 1, the nozzle being formed with a V-shaped notch extending in an upward and downward direction so that pressure and heating gas is diffused an angle of between 30 and 45 degrees in the upward and downward direction.

The upper and lower metal molds 4 and 6 are put together, and then the bladder 10 is inserted inside the tire 8. After a so-called shaping operation, steam of lower density among the pressure and heating gas G is first emitted in the bladder 10 by a plurality of the diffusion nozzles 18, and then gas of higher density is emitted. In this instance, in accordance with present invention, each of the diffusion nozzles 18 is arranged such that the diffusion direction A is substantially coincident with the tangential direction T of the circle B and that the diffusion angle $\theta$ is between 30 and 45 degrees in the upward and downward direction V. Accordingly, the pressure and heating gas G is emitted in the tangential direction T of the circle B as shown in FIG. 6 and diffused at an angle of between 30 and 45 degrees in the upward and downward direction V as shown in FIGS. 1 and 2. Although the pressure and heating gas G is not diffused excessively in a horizontal direction or leftward and rightward direction as shown in FIG. 6, there is no problem in achieving the effect of the present invention. For this reason, the pressure and heating gas G impinges upon an inner surface 10b of the outer circumference of the bladder 10 and is diffused along the inner surface 10b in the circumferential directions C indicated in FIG. 6 and in the upward and downward directions F indicated in FIG. 1. For this reason, the steam of lower density and the gas of higher density as a whole constituting the pressure and heating gas G are effectively agitated and evenly mixed in the circumferential direction and the upward and downward direction in succession from the beginning to the end. Accordingly, it will be seen from FIG. 7 that, in the tire vulcanizer 1 according to the present invention, the difference of temperature between a highest position H and a lowest position L of the bladder 10 is considerably decreased as compared with the conventional tire vulcanizer of FIG. 7. For this reason, the quantity of heat of the pressure and heating gas G is efficiently and evenly transferred to the tire 8. As a consequence, the time of vulcanization is shortened, and tires evenly vulcanized and of excellent quality can be produced.

The second embodiment embodying the present invention will hereinafter be described in conjunction with FIGS. 8 to 11.

Figure 8:
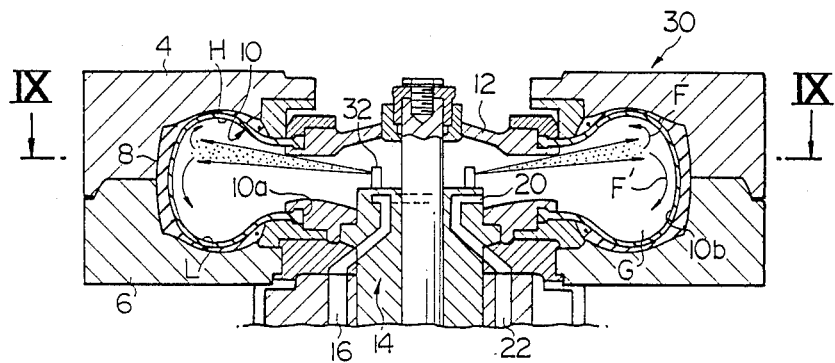
FIG. 8 is a cross-sectional view showing the tire vulcanizer constructed in accordance with another embodiment of the present invention.
Figure 9:
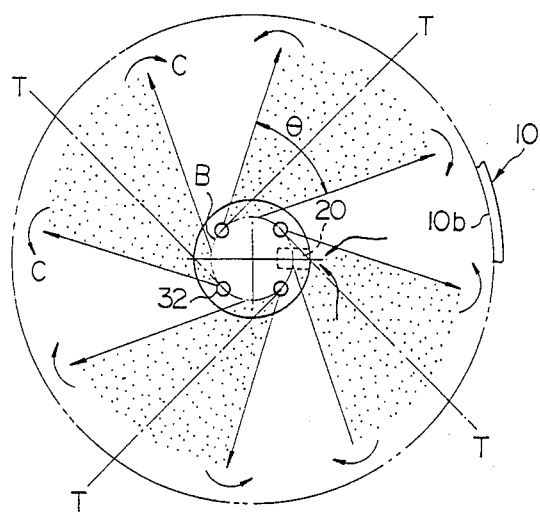
FIG. 9 is a cross-sectional view showing a bladder and diffusion nozzles substantially taken along line IX—IX indicated in FIG. 8.

FIG. 8 shows a tire vulcanizer 30 constructed in accordance with the second embodiment of the present invention. The portions and members substantially identical in construction to the aforementioned first embodiment will be designated by like reference numerals and the detailed description will be omitted. As shown in FIG. 9, a plurality of diffusion nozzles 32 are arranged equiangularly on a circle B at the central portion of a metal mold assembly 2 of the tire vulcanizer 30. In this embodiment, each of the diffusion nozzles 32 is formed at the side portion thereof with a side notch 34 in such a manner that the pressure and heating gas G is emitted slightly upward from the side notch 34 and diffused at an angle $\theta$ of between 80 and 120 degrees in the horizontal direction. Accordingly, the pressure and heating gas G is first diffused widely in the horizontal as shown in FIG. 9, then impinges upon a portion slightly above the circumferential inner surface 10b of the bladder 10 and flows in the upward and downward directions F and F' indicated in FIG. 8. As a result, as the steam of lower density and the gas of higher density are effectively agitated and mixed, the difference of temperature between the highest position H and the lowest position L is excessively decreased, as shown in FIG. 7, as compared with the conventional tire vulcanizer.

While it has been illustrated and described that the diffusion direction is mainly one direction such as upward and downward direction (first embodiment) or horizontal direction (second embodiment), it is noted that a diffusion nozzle 40 may be formed at its forward end 40a with a first V-shaped notch 42 and a second V-shaped notch 44 so that the pressure and heating gas G is diffused in two directions of the horizontal direction and the upward and downward direction. The first and second V-shaped notches 42 and 44 are crossed with each other at an opening 46 that is held in fluid communication with a gas supply passage. The first V-shaped notch 42 extends in the horizontal direction H indicated in FIG. 12 so that the pressure and heating gas G is diffused at an diffusion angle of between 30 and 45 degrees in the horizontal direction H. The second V-shaped notch 44 extends in the vertical direction V indicated in FIG. 12 so that the pressure and heating gas G is diffused at an diffusion angle of between 30 and 45 degrees in the vertical direction V. In such a diffusion nozzle 40, the effect of the present invention can be more effectively achieved as compared with the aforementioned first and second embodiment of the present invention.

From the foregoing description, it will be seen that, since diffusion means for diffusing pressure and heating gas is provided, according to the present invention, in the gas supply assembly for supplying the pressure and heating gas to the bladder, the pressure and heating gas is diffused widely in the upward and downward direction or in the horizontal direction or in both directions. For this reason, the pressure and heating gas is effectively agitated within the bladder and evenly mixed, thereby alleviating that the difference of temperature occurs in the upward and downward direction and the horizontal direction within the bladder. Accordingly, the quantity of heat of the pressure and heating gas is efficiently and evenly transferred through the bladder to the tire, so that the time of vulcanization is shortened and tires evenly vulcanized and of excellent quality can be produced.

While certain representative embodiments and details have been shown for the purpose of illustrating the present invention, it will be apparent to those skilled in this art that various changes and modifications may be made therein without departing from the spirit or scope of the invention.

What I claim is:

1. A tire vulcanizer comprising
   a metal mold assembly
   a bladder within said metal mold assembly,
   a gas supply assembly arranged at a central portion of said metal mold assembly and adapted to supply pressure and heating gas to said bladder,
   and diffusion means provided in said gas supply assembly,
   said diffusion means being a plurality of diffusion nozzles each formed with a V-shaped notch extending in an upward and downward direction with respect to an axially extending axis of said diffusion nozzle so that said pressure and heating gas is diffused at an angle of between 30 and 45 degrees in said upward and downward direction.

2. A tire vulcanizer as set forth in claim 1, in which said diffusion nozzles are arranged equiangularly on a circle, which is in concentric relation with said metal mold assembly, so that said pressure and heating gas is emitted in a direction tangential to said circle.

3. A tire vulcanizer as set forth in claim 1, in which said diffusion nozzles are formed with a side notch so that said pressure and heating gas is diffused at an angle of between 80 and 120 degrees in a horizontal direction.

4. A tire vulcanizer as set forth in claim 3, in which said diffusion nozzles are arranged equiangularly on a circle, which is in concentric relation with said metal mold assembly, so that said pressure and heating gas is emitted in a direction tangential to said circle.

5. A tire vulcanizer comprising
   a metal mold assembly,
   a bladder disposed within said metal mold assembly,
   a gas supply assembly arranged at a central portion of said metal mold assembly and adapted to supply pressure and heating gas to said bladder,
   and diffusion means provided in said gas supply assembly,
   said diffusion means being a plurality of diffusion nozzles each formed with a first V-shaped notch extending in a horizontal direction so that said pressure and heating gas is diffused at an angle of between 30 and 45 degrees in said horizontal direction and with a second V-shaped notch extending in a vertical direction so that said pressure and heating gas is diffused at an angle of between 30 and 45 degrees in said vertical direction.

6. A tire vulcanizer as set forth in claim 5, in which said diffusion nozzles are arranged equiangularly on a circle, which is in concentric relation with said metal mold assembly, so that said pressure and heating gas is emitted in a direction tangential to said circle.

* * * * *